US007653734B1

(12) United States Patent
Aho

(10) Patent No.: US 7,653,734 B1
(45) Date of Patent: Jan. 26, 2010

(54) METHOD FOR IMPLEMENTING A MULTIMEDIA MESSAGING SERVICE, A MULTIMEDIA MESSAGING SYSTEM, A SERVER OF A MULTIMEDIA MESSAGING SYSTEM AND A MULTIMEDIA TERMINAL

(75) Inventor: Outi Aho, Lempäälä (FI)

(73) Assignee: Nokia Corporation, Espoo (FI)

( * ) Notice: Subject to any disclaimer, the term of this patent is extended or adjusted under 35 U.S.C. 154(b) by 1351 days.

(21) Appl. No.: 09/707,140

(22) Filed: Nov. 6, 2000

(30) Foreign Application Priority Data

Nov. 5, 1999   (FI) .................................. 19992401
Dec. 23, 1999  (FI) .................................. 19992775

(51) Int. Cl.
*G06F 15/16* (2006.01)

(52) U.S. Cl. ....................................... 709/231; 709/249

(58) Field of Classification Search ................ 709/206, 709/219, 203, 226, 228, 201, 202, 231, 237, 709/204, 205, 247; 455/432, 445, 456, 414, 455/412, 550, 442, 437, 557, 436; 370/468, 370/352, 353, 354, 252, 491, 260, 342, 206, 370/329, 335; 375/219; 707/3; 701/213; 348/143; 715/530, 501, 762; 340/573; 711/122; 710/62; 725/116; 379/93
See application file for complete search history.

(56) References Cited

U.S. PATENT DOCUMENTS

| 5,513,126 | A | * | 4/1996 | Harkins et al. ............... 709/228 |
| 5,530,917 | A | * | 6/1996 | Andersson et al. ........... 455/436 |
| 5,544,321 | A | * | 8/1996 | Theimer et al. .............. 709/226 |
| 5,584,025 | A | * | 12/1996 | Keithley et al. ........... 707/104.1 |
| 5,592,469 | A | * | 1/1997 | Szabo ......................... 370/342 |
| 5,617,539 | A | * | 4/1997 | Ludwig et al. ............... 709/205 |
| 5,694,334 | A | * | 12/1997 | Donahue et al. ............. 709/247 |
| 5,717,955 | A | * | 2/1998 | Swinehart ..................... 710/62 |
| 5,740,384 | A | * | 4/1998 | Asthana et al. .............. 710/305 |
| 5,751,704 | A | * | 5/1998 | Kostic et al. ................. 370/335 |

(Continued)

FOREIGN PATENT DOCUMENTS

EP         0993148 A   *   4/2000

(Continued)

OTHER PUBLICATIONS

WAP Forum—W3C Cooperation White Paper ;.www.w3.org/TR/NOTE-W.*

(Continued)

*Primary Examiner*—Thong H Vu
(74) *Attorney, Agent, or Firm*—Perman & Green, LLP

(57) ABSTRACT

A method for implementing a multimedia messaging service between a wireless terminal (MS) that communicates with a communication network (12, 15, 18) over a radio path and a server (20) includes receiving and storing a multimedia message addressed to the wireless terminal at a server, the multimedia message comprising at least one multimedia component, and storing information on at least one property of the wireless terminal (MS) in the server. The method further includes determining if there is any component of the multimedia message, which the wireless terminal can handle according to the stored information on at least one property of the wireless terminal. If there exists one or more such component(s), they are selected for transmission and transmitted to the wireless terminal.

33 Claims, 5 Drawing Sheets

U.S. PATENT DOCUMENTS

| | | | | |
|---|---|---|---|---|
| 5,848,415 | A * | 12/1998 | Guck | 707/10 |
| 5,901,287 | A * | 5/1999 | Bull et al. | 709/218 |
| 6,006,227 | A * | 12/1999 | Freeman et al. | 707/7 |
| 6,029,195 | A * | 2/2000 | Herz | 725/116 |
| 6,047,051 | A * | 4/2000 | Ginzboorg et al. | 379/130 |
| 6,052,735 | A * | 4/2000 | Ulrich et al. | 709/236 |
| 6,085,222 | A * | 7/2000 | Fujino et al. | 709/202 |
| 6,105,036 | A * | 8/2000 | Henckel | 707/104.1 |
| 6,134,235 | A * | 10/2000 | Goldman et al. | 370/352 |
| 6,163,809 | A * | 12/2000 | Buckley | 709/237 |
| 6,167,040 | A * | 12/2000 | Haeggstrom | 370/352 |
| 6,167,261 | A * | 12/2000 | Amin | 455/426.1 |
| 6,172,673 | B1 * | 1/2001 | Lehtinen et al. | 715/716 |
| 6,181,714 | B1 * | 1/2001 | Isaksson et al. | 370/491 |
| 6,199,099 | B1 * | 3/2001 | Gershman et al. | 709/203 |
| 6,200,216 | B1 * | 3/2001 | Peppel | 463/1 |
| 6,211,869 | B1 * | 4/2001 | Loveman et al. | 715/723 |
| 6,216,013 | B1 * | 4/2001 | Moore et al. | 455/557 |
| 6,236,909 | B1 * | 5/2001 | Colson et al. | 701/1 |
| 6,249,844 | B1 * | 6/2001 | Schloss et al. | 711/122 |
| 6,260,050 | B1 * | 7/2001 | Yost et al. | 715/501.1 |
| 6,301,482 | B1 * | 10/2001 | Shohara | 455/452.1 |
| 6,308,171 | B1 * | 10/2001 | De La Huerga | 707/3 |
| 6,314,094 | B1 * | 11/2001 | Boys | 370/352 |
| 6,314,302 | B1 * | 11/2001 | Haferbeck et al. | 455/550.1 |
| 6,314,457 | B1 * | 11/2001 | Schena et al. | 709/219 |
| 6,317,584 | B1 * | 11/2001 | Abu-Amara et al. | 455/12.1 |
| 6,330,244 | B1 * | 12/2001 | Swartz et al. | 370/401 |
| 6,356,529 | B1 * | 3/2002 | Zarom | 370/231 |
| 6,363,411 | B1 * | 3/2002 | Dugan et al. | 709/202 |
| 6,366,554 | B1 * | 4/2002 | Isaksson et al. | 370/206 |
| 6,385,451 | B1 * | 5/2002 | Kalliokulju et al. | 455/437 |
| 6,411,807 | B1 * | 6/2002 | Amin et al. | 455/432.3 |
| 6,415,439 | B1 * | 7/2002 | Randell et al. | 725/153 |
| 6,421,707 | B1 * | 7/2002 | Miller et al. | 709/206 |
| 6,446,130 | B1 * | 9/2002 | Grapes | 709/231 |
| 6,456,594 | B1 * | 9/2002 | Kaplan et al. | 370/238 |
| 6,466,971 | B1 * | 10/2002 | Humpleman et al. | 709/220 |
| 6,469,714 | B2 * | 10/2002 | Buxton et al. | 715/762 |
| 6,469,998 | B1 * | 10/2002 | Burgaleta Salinas et al. | 370/338 |
| 6,498,865 | B1 * | 12/2002 | Brailean et al. | 382/239 |
| 6,501,741 | B1 * | 12/2002 | Mikkonen et al. | 370/310 |
| 6,510,153 | B1 * | 1/2003 | Inoue et al. | 370/354 |
| 6,522,875 | B1 * | 2/2003 | Dowling et al. | 455/414.3 |
| 6,538,623 | B1 * | 3/2003 | Parnian et al. | 345/8 |
| 6,539,118 | B1 * | 3/2003 | Murray et al. | 382/229 |
| 6,542,819 | B1 * | 4/2003 | Kovacs et al. | 701/213 |
| 6,546,005 | B1 * | 4/2003 | Berkley et al. | 370/353 |
| 6,553,412 | B1 * | 4/2003 | Kloba et al. | 709/219 |
| 6,557,001 | B1 * | 4/2003 | Dvir et al. | 707/101 |
| 6,567,667 | B1 * | 5/2003 | Gupta et al. | 455/445 |
| 6,584,146 | B2 * | 6/2003 | Bose et al. | 375/219 |
| 6,587,457 | B1 * | 7/2003 | Mikkonen | 370/356 |
| 6,594,258 | B1 * | 7/2003 | Wallentin et al. | 370/252 |
| 6,600,917 | B1 * | 7/2003 | Maupin | 455/414.1 |
| 6,606,479 | B2 * | 8/2003 | Cook et al. | 434/350 |
| 6,608,832 | B2 * | 8/2003 | Forslow | 370/353 |
| 6,611,674 | B1 * | 8/2003 | Jokimies et al. | 455/69 |
| 6,629,130 | B2 * | 9/2003 | Mertama et al. | 709/206 |
| 6,633,906 | B1 * | 10/2003 | Callaway et al. | 709/223 |
| 6,636,256 | B1 * | 10/2003 | Passman et al. | 348/143 |
| 6,643,284 | B1 * | 11/2003 | Inoue et al. | 370/352 |
| 6,647,535 | B1 * | 11/2003 | Bozdagi et al. | 715/530 |
| 6,654,601 | B2 * | 11/2003 | Picoult et al. | 455/412.1 |
| 6,658,254 | B1 * | 12/2003 | Purdy et al. | 455/445 |
| 6,674,733 | B1 * | 1/2004 | Huusko | 370/329 |
| 6,677,858 | B1 * | 1/2004 | Faris et al. | 340/573.1 |
| 6,678,361 | B2 * | 1/2004 | Rooke et al. | 379/93.24 |
| 6,693,915 | B1 * | 2/2004 | Lappetelainen et al. | 370/468 |
| 6,714,778 | B2 * | 3/2004 | Nykanen et al. | 455/414.1 |
| 6,725,038 | B1 * | 4/2004 | Subbiah | 455/436 |
| 6,731,940 | B1 * | 5/2004 | Nagendran | 455/456.1 |
| 6,738,800 | B1 * | 5/2004 | Aquilon et al. | 709/206 |
| 6,760,324 | B1 * | 7/2004 | Scott et al. | 370/352 |
| 6,763,388 | B1 * | 7/2004 | Tsimelzon | 709/228 |
| 6,771,964 | B1 * | 8/2004 | Einola et al. | 455/437 |
| 6,772,212 | B1 * | 8/2004 | Lau et al. | 709/228 |
| 6,792,273 | B1 * | 9/2004 | Tellinger et al. | 455/442 |
| 6,850,614 | B1 * | 2/2005 | Collins | 379/265.09 |
| 6,859,882 | B2 * | 2/2005 | Fung | 713/300 |
| 6,898,207 | B2 * | 5/2005 | Boasson et al. | 370/463 |
| 6,963,783 | B1 * | 11/2005 | Bi et al. | 700/94 |
| 7,000,107 | B2 * | 2/2006 | Hewett et al. | 713/164 |
| 7,028,264 | B2 * | 4/2006 | Santoro et al. | 715/765 |
| 7,062,765 | B1 * | 6/2006 | Pitzel et al. | 717/177 |
| 7,065,553 | B1 * | 6/2006 | Chesley et al. | 709/205 |
| 7,113,780 | B2 * | 9/2006 | McKenna et al. | 455/431 |
| 7,152,092 | B2 * | 12/2006 | Beams et al. | 709/204 |
| 7,190,681 | B1 * | 3/2007 | Wu | 370/316 |
| 7,200,385 | B1 * | 4/2007 | Wallenius et al. | 455/414.1 |
| 7,209,949 | B2 * | 4/2007 | Mousseau et al. | 709/206 |
| 7,249,344 | B1 * | 7/2007 | Zeanah et al. | 717/100 |
| 2001/0003191 | A1 * | 6/2001 | Kovacs et al. | 709/226 |
| 2002/0045808 | A1 * | 4/2002 | Ford et al. | 600/347 |
| 2002/0111907 | A1 * | 8/2002 | Ling | 705/41 |
| 2002/0194130 | A1 * | 12/2002 | Maegawa et al. | 705/51 |
| 2002/0196127 | A1 * | 12/2002 | Benson | 340/10.4 |
| 2003/0195976 | A1 * | 10/2003 | Shiigi | 709/230 |
| 2003/0219030 | A1 * | 11/2003 | Gubbi | 370/442 |
| 2004/0162125 | A1 * | 8/2004 | Tarlie | 463/3 |
| 2005/0033632 | A1 * | 2/2005 | Wu et al. | 705/10 |
| 2005/0120082 | A1 * | 6/2005 | Hesselink et al. | 709/203 |
| 2005/0246752 | A1 * | 11/2005 | Liwerant et al. | 725/109 |
| 2006/0031237 | A1 * | 2/2006 | DeAnna et al. | 707/100 |
| 2006/0045030 | A1 * | 3/2006 | Bieselin | 370/260 |
| 2008/0146272 | A1 * | 6/2008 | Rao et al. | 455/556.1 |

FOREIGN PATENT DOCUMENTS

| | | |
|---|---|---|
| FI | 981387 | 12/1999 |
| JP | 411274993 A * | 10/1999 |
| WO | 97/14244 | 4/1997 |
| WO | WO 98/03005 | 1/1998 |
| WO | 98/19438 | 5/1998 |
| WO | WO 98/19438 | 5/1998 |
| WO | WO 98/26592 * | 6/1998 |
| WO | 99/56431 | 11/1999 |
| WO | WO 99/56431 | 11/1999 |
| WO | WO 99/62258 * | 12/1999 |
| WO | WO 99/66746 | 12/1999 |
| WO | WO 00/64110 | 10/2000 |

OTHER PUBLICATIONS

On using nomadic services for distributed intelligence; Computer Communications and Networks, 1999. Proceedings. Eight International Conference on , Oct. 11-13, 1999.*

Mobile Internet telephony protocol: an application layer protocol for mobile Internet telephony services Wanjiun Liao; Communications, 1999. ICC '99. 1999 IEEE International Conference on , vol. 1, Jun. 6-10, 1999.*

The SpectrumWare Approach to Wireless Signal Processing; www.tns.lcs.mit.edu/publications/winet95/winet95.html.*

Summary of Research Task Force Reports; www.altp.org/SSP/SummaryofResearchTaskForceReports.htm.*

Multimedia Broadcasting and the Internet; www.isoc.org/isoc/whatis/conferences/inet/96/proceedings/b3/b3_2.htm.*

Adaptive Web Sites: Automatically Synthesizing Web Pages—Perkowitz, Etzioni (1998) www.cs.washington.edu/homes/map/research/papers/aaai98.ps.*

Resource Description Framework (RDF) Model and Syntax..—Lassila, Swick (1998) www.dbis.informatik.hu-berlin.de/lehre/SS99/ecseminar/paper/thema3/WD-rdf-syntax-19981008.ps.gz.*

Navigational Plans For Data Integration—Friedman, Levy, Millstein (1999) ftp.cs.washington.edu/pub/ai/friedman/aaai99-corrected.ps.Z.*

A burst-level error generation model for 2 GHz personal radio communications Betti, A.; Costamagna, E.; Favalli, L.; Savazzi, P.; Vehicular Technology Conference, 1999. VTC 1999—Fall. IEEE VTS 50th vol. 1, Sep. 19-22, 1999 pp. 102-106 vol. 1.*

Quality of service and system design Kornegay, K.T.; Gang Qu; Potkonjak, M.; VLSI '99. Proceedings IEEE Computer Society Workshop On Apr. 8-9, 1999 pp. 112-117.*

The mobiware toolkit: programmable support for adaptive mobile networking Angin, O.; Campbell, A.T.; Kounavis, M.E.; Liao, R.R.-F.; Personal Communications, IEEE [see also IEEE Wireless Communications] vol. 5, Issue 4, Aug. 1998 pp. 32-43.*

Wireless Internet Access Using Anonymous Access Methods. Petri Joketa. Ericsson, Nomamadic Lab. Jun. 1999.IEEE.*

On Using Nomadic Services for Distributed Intelligent. P.L. Simeonov. Siemens AG. Sep. 1999.IEEE.*

Handling Multimedia Data for Mobile Computer. Charles E.Perkins IBM. 1996. IEEE.*

The Proposal of Wireless Multimedia Communication System with Integration of Packet-switched and Circuit-switched Channels. OONO & Tanaka, NTT Lab. Sep. 1998. IEEE.*

A Multimedia Communication Architecture for Handheld Devices. Jen Meggers et al. Sep. 1998 IEEE.*

Personal Mobile Multimedia Communications in a Wirelss WAN Environment. Wu et al. Aug. 1997 IEEE.*

Location-Oriented Multimedia. Jean Bacon et al. 1997 IEEE.*

Itelligent Decision Aids for 21 st C4I Architectures. Ram Voruganti et al. Jun. 1997 IEEE.*

Translation of Abstract of Finnish Patent Application No. 981387, Nov. 1999.

Japanese Office Action dated May 27, 2008.

* cited by examiner

METHOD FOR IMPLEMENTING A MULTIMEDIA MESSAGING SERVICE, A MULTIMEDIA MESSAGING SYSTEM, A SERVER OF A MULTIMEDIA MESSAGING SYSTEM AND A MULTIMEDIA TERMINAL

This application is related to application Ser. No. 09/707,103, filed on 6 Nov. 2000.

A method for implementing a multimedia messaging service, a multimedia messaging system, a server of a multimedia messaging system and a multimedia terminal.

BACKGROUND OF THE INVENTION

1. Field of the Invention

The present invention relates to a method according to the preamble of the appended claim 1 for implementing a multimedia messaging service. Moreover, the invention relates to a server of a multimedia messaging system according to the preamble of the appended claim 14. The invention also relates to a wireless terminal according to the preamble of the appended claim 25.

2. Brief Description of Related Developments

Wireless communication networks and the Internet network are expanding rapidly and the number of users of these networks is growing. It is possible to introduce advanced Internet services in digital mobile stations of wireless communications networks, such as so-called media phones, for example by means of WAP technology. WAP is an open standard, which is designed to globally support most digital wireless communication networks, such as GSM (Global System for Mobile Communications) GPRS (General Packet Radio Service), PDC (Personal Digital Cellular), CDMA IS-95 (Code Division Multiple Access), TDMA IS-136 (Time Division Multiple Access), and third generation networks such as WCDMA (Wideband CDMA) and CDMA-2000. Because the WAP system has been developed only recently, and because the specifications of the WAP system in some cases merely determine the framework for different implementations, there are no known solutions for implementing particular functions of the WAP system.

In a WAP system (FIG. 1) the terminal, or a wireless terminal MS, here a so-called WAP terminal, which utilizes the WAP protocol for external communication, can communicate with a server 20 of the Internet network. The connection between the WAP terminal and the Internet network is implemented by a WAP gateway 15 which functions as a means for transmitting messages between the WAP terminal MS and the Internet network 18. When necessary, the WAP gateway 15 transforms messages directed to the Internet network by the WAP terminal MS into messages according to an Internet protocol, such as TCP/IP protocol (Transmission Control Protocol/Internet Protocol). Correspondingly, messages addressed to the WAP terminal MS in the wireless network 12 from the Internet network 18 are transformed, when necessary, into messages according to a WAP protocol (for example WSP, Wireless Session Protocol) in the WAP gateway.

As such, the WAP terminal MS can be any device which utilizes WAP protocols for external communication, such as a mobile station of a cellular network, or a computer terminal connected to the wireless network 12 for example via a mobile station of a cellular network or via a radio card removably attached to the computer terminal, for example via an interface compatible with PCMCIA (Personal Computer Memory Card International Association) standards.

Communication modes supported by the WAP and intended for transmission of information over the radio path are called bearers. These include, for example, short messages (SMS, Short Message Service), data calls (CSD, Circuit Switched Data) and packet radio i.e., GPRS services, USSD service (Unstructured Supplementary Service Data) as well as other bearers defined in the WAP specifications.

The WAP system is a hierarchical system as far as its communication protocols are concerned. Both the WAP terminal and the WAP gateway comprise a WAP protocol stack which is implemented by means of software and which comprises certain WAP protocol layers. The WAP protocol layers include, for example, a WAE layer (Wireless Application Environment), a WSP layer (Wireless Session Protocol), a WTP layer (Wireless Transaction Protocol), as well as a WDP layer (Wireless Datagram Protocol). Corresponding WAP protocol layers of the WAP terminal and the WAP gateway communicate with each other to provide reliable data transmission between the WAP terminal and the WAP gateway using a particular bearer.

For a long time, users of a computer terminal connected to the Internet network have had an opportunity to retrieve multimedia components, such as images, text, short video clips and audio clips in electronic format into their computer terminal from a server of the Internet network. As data transmission rates increase and the properties of mobile stations improve, interest in a multimedia messaging service has also arisen in wireless networks. However, for example in connection with the WAP system, a solution has not yet been presented for implementing a multimedia messaging service.

International patent application WO 98/19438 discloses a solution for implementing a multimedia messaging service in a telecommunication network. The multimedia messaging system disclosed in document WO 98/19438 comprises a multimedia message store, in which a multimedia message addressed to a specific user is stored. The user is given the opportunity to communicate the multimedia properties of his/her terminal to the multimedia messaging system, which translates said multimedia message either partly or entirely, taking into account the properties of the user's terminal. Thereafter, the multimedia messaging system transmits the multimedia message to the users terminal. In the arrangement presented in document WO 98/19438, information on the properties of the user's terminal is transmitted to the multimedia messaging system at the stage when the user's terminal is informed of an incoming message, wherein the terminal and the multimedia messaging system conduct connection set-up signalling (dynamic dialogue) to set up a connection to transfer the multimedia components of the multimedia message. However, the properties of the user's terminal do not necessarily change, wherein the transmission of properties in connection with establishment of every connection causes unnecessary loading of the data network, such as the mobile communication network used for the transmission of the multimedia message.

When the multimedia messaging service is implemented in connection with wireless communication systems, new problems arise due to the limited capacity of the wireless terminal and the radio path. For example, the mobile terminal may have limitations in terms of its processing power and/or available memory, while the wireless communication network may have limited transmission bandwidth.

For third generation mobile communication networks, such as WCDMA, a multimedia messaging service has been proposed, which would be implemented in a similar manner to the short message service, i.e. substantially by pushing messages addressed to a wireless terminal and stored in a particular message service centre to the wireless terminal as soon as it can be reached. However, problems arise when multimedia messages are transmitted to the wireless terminal. Because of the limited storage capacity of the wireless terminal, such as a mobile station of a cellular network, the multimedia message will not necessarily fit into the available memory of the mobile station. A multimedia message transmitted to the wireless terminal can also contain elements that cannot be processed by the wireless terminal, possibly because of the terminal's technical limitations (e.g. insufficient processing capacity, lack of video properties, lack of suitable software), wherein radio resources are unnecessarily wasted when said elements are transmitted to the wireless terminal.

In a multimedia messaging service under development for third generation mobile networks, it has been suggested that the data transmission conducted between the wireless terminal and the multimedia messaging system, concerning the properties of the wireless terminal is necessary so that in connection with the transmission of multimedia messages it can be ensured that the receiving terminal is capable of receiving and processing the multimedia message, taking into account the user's own special settings when necessary. The transmission of properties can be performed at different layers of the protocol stack, such as the application layer and the link layer.

In connection with the process of informing of the properties, the wireless terminal transmits information on the properties of the wireless terminal and the multimedia messaging client used therein to the multimedia messaging system. These properties can be roughly categorized in four different groups: 1) hardware properties, 2) software properties, 3) properties of the multimedia service application (User Agent) and 4) special multimedia message specific properties.

Many of the aforementioned properties include properties which do not change and are primarily dependent on the model and version of the terminal. Some of the terminal's properties are dependent, for example, on the application software used in the terminal. A few such properties are e.g. software-based decoders supported in the terminal, protocol properties, etc. These properties are comparatively constant, but for example in connection with software updates or when accessories are attached to the wireless terminal, software properties can change. The properties of the multimedia application include, for example, the properties of the MMS User Agent, settings which can be configured by the user, etc. Special multimedia message specific properties are typically only associated with a particular multimedia message, and are conveyed in connection with the transmission of the multimedia message in question.

In the process of developing a multimedia messaging service for the WAP system, it has been suggested that a wireless session (WSP session) shall be established for each multimedia message, wherein when each such session is set up, the properties of the wireless terminal receiving the multimedia message are transmitted from the wireless terminal to a multimedia message service centre. To enable this, a so-called user agent profile (UAProf) has been developed, which contains information on the properties of the wireless terminal (CPI, capability and preference information), such as information on the properties (capability) and the settings (preferences) related to the multimedia functions, made by the user of the wireless terminal in question. As previously mentioned in this description, the properties of the wireless terminal are relatively constant and thus the presented arrangement loads the radio resources unnecessarily.

International patent publication WO 99/56431 presents a method of handling a Wireless Session Protocol (WSP) in which a communication terminal initiates a WAP session by forwarding a request for certain data to a server. The request sent by the communication terminal to the server comprises an identification of the requested data and a terminal identification number previously allocated to the communication terminal by the server. When it receives the request, containing the terminal's identification number, the server retrieves user profile information from an associated database memory. The user profile information indicates a data format that can be handled by the communication terminal and the server subsequently replies to the request by forwarding the requested data to the communication terminal in the format defined in the stored user profile information. In this way it is not necessary for the communication terminal to provide the server with information about its data handling properties in connection with the establishment of each session.

It should be noted that the method described in WO 99/56431 operates in such a way that data requested by the receiving terminal is transmitted to the terminal in a format the terminal can handle. This implies, for example, that the server should either store data to be downloaded in a number of different formats or that it is capable of translating data from one format that is not suitable for a given communication terminal into another format that is suitable for the terminal in question. This approach may work well, for example, in a situation where certain content is provided for download from a given server. The data available for download can then be stored in the server, for example in a limited number of commonly used data formats, or translation functionality can be provided to convert the stored data into any one of a number of commonly used alternative formats. However, in a multimedia messaging service, the server that stores multimedia messages (i.e. the multimedia message service centre MMSC) can receive multimedia messages from a very wide variety of sources and the type and format of the multimedia components contained by those messages can also be extremely diverse. In other words, the server has no control over the type or format of the data (multimedia messages) it receives for forwarding. Furthermore, the properties of the terminal(s) intended to receive the multimedia messages may be significantly different. Thus, it is difficult and expensive in terms of computing power and complexity to provide comprehensive data translation functionality capable of matching any possible multimedia component received at the MMSC to the properties of any likely receiving terminal.

SUMMARY OF THE INVENTION

It is an aim of the present invention to introduce a method and a system for transmitting multimedia messages, in which unnecessary message transmission can be avoided. The method according to the invention is characterized by that which is presented in the characterizing part of the appended claim 1. A multimedia messaging system according to the present invention is characterized by that which is presented in the characterizing part of the appended claim 19. A server of a multimedia messaging system according to the present invention is characterized that which is presented in the characterizing part of the appended claim 35. Furthermore, a wireless terminal according to the present invention is characterized by that which is presented in the characterizing part of the appended claim 43.

The invention is based on the idea that information on the properties of the wireless terminal is stored in the multimedia messaging system, advantageously in a multimedia message service centre, whereupon property information does not have to be transmitted in connection with each message. In the method according to a preferred embodiment of the invention, a maximum time of validity is set for the property information, in which case, before transmitting a message to the wireless terminal, the system determines whether the property information is still relevant or whether information on the properties of the wireless terminal should be updated before transmitting the message.

By applying the present invention, considerable advantages are achieved when compared to solutions of prior art. When the method according to the invention is applied, it is possible to reduce data transmission between a wireless terminal and a multimedia messaging system, whereupon the resources of the message transmission system are not unnecessarily wasted and it is possible to increase the system's utilization. Furthermore, by means of the arrangement according to the invention, it is possible to speed up the transmission of multimedia messages because it is not always necessary to determine the properties of the wireless terminal.

In the system according to a preferred embodiment of the invention, it is not necessary at the application level for the wireless terminal to request the multimedia service centre to transmit multimedia message components which can be processed by the wireless terminal. Thus, those components of a multimedia message which the receiving wireless terminal can handle according to the property information of the receiving wireless terminal stored in the multimedia message transmission system, are transmitted to the wireless terminal. By means of this arrangement it is possible to reduce the data transmission conducted between the wireless terminal and the multimedia messaging system.

BRIEF DESCRIPTION OF THE DRAWINGS

In the following, the invention will be described in more detail with reference to the appended drawings, in which.

DETAILED DESCRIPTION OF THE PREFERRED EMBODIMENT(S)

Figure 1:
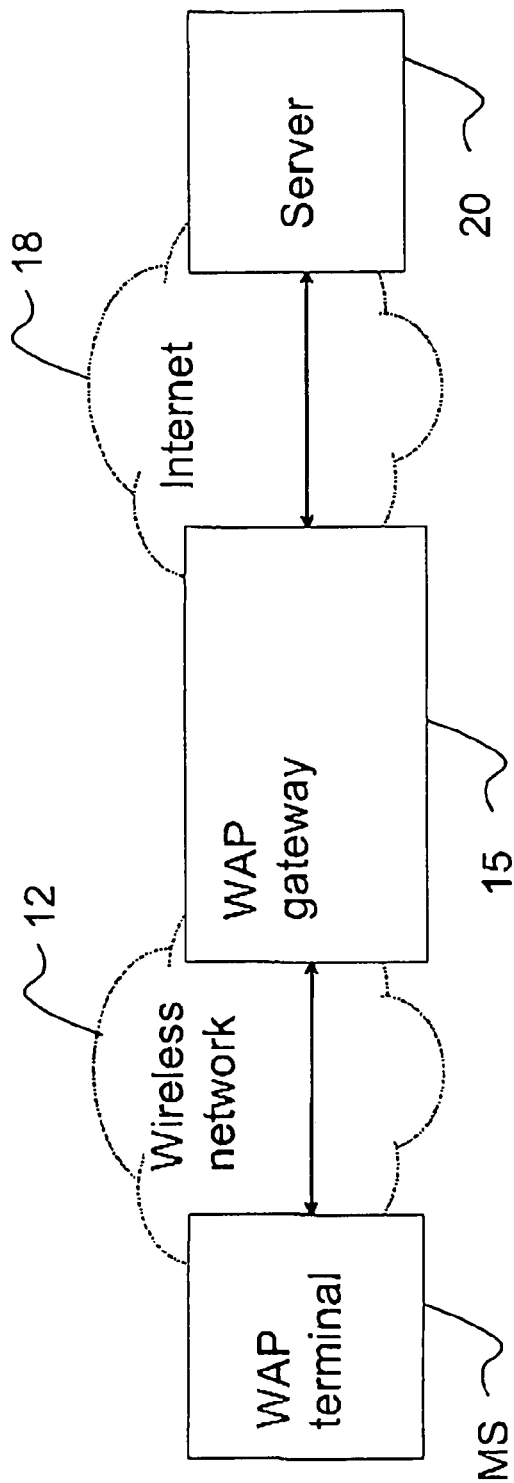
FIG. 1 shows a prior art model of a WAP system.

The WAP system according to FIG. 1 was presented above in connection with the description of prior art. In a preferred embodiment of the invention, which is illustrated in the appended FIG. 2, a multimedia messaging system is examined in a situation in which a wireless terminal MS which uses the WAP protocol for communication, has subscribed to a multimedia messaging service from a multimedia message service centre MMSC. The multimedia message service centre MMSC is a network element, a server, which can be located for example in a cellular network or in the Internet. The multimedia message service centre MMSC functions as a means in the multimedia messaging system which stores a multimedia message addressed to a wireless terminal MS in its memory, if the wireless terminal MS to which the multimedia message in question is addressed cannot be reached.

The multimedia message service centre MMSC forwards the multimedia message to the wireless terminal MS when it can be reached again. This situation may arise, for example, if the wireless terminal is turned off, or if it is outside the area of coverage of the wireless telecommunication network. It should be noted that storage of the multimedia message in the server is implicit. In other words, when a multimedia message addressed to a certain terminal is received by the MMSC, that message becomes present in the memory of the MMSC. That memory may be, for example, the MMSC's random access memory (RAM), or it may be some other physical memory means, such as a hard disk drive. Thus, even in a situation in which the terminal to which the message is addressed can be contacted substantially at once, temporary storage of the multimedia message in the MMSC may still be considered to take place. In the event that the server must store the multimedia message for a longer period of time, some limit may be placed on the maximum length of time for which the message can be stored. This can be determined, for example, by the subscription options of the addressed terminal. This message transmission mechanism is called store-and-forward messaging. A corresponding arrangement is known in connection with short messages in the GSM network, in which the short message service centre SMSC of the network conducts the store-and-forward transmission of short messages.

The multimedia message service centre MMSC communicates with the wireless terminal MS via WAP gateway 15. Physically, the multimedia message service centre MMSC is advantageously located in the same part of the Internet network as the WAP gateway 15. Typically, communication between the multimedia message service centre MMSC and the WAP gateway 15 is implemented according to Internet protocols (IP protocols). These include, for example, TCP/IP and HTTP 1.1.

When a multimedia message, which may contain one or more multimedia components and is addressed to a wireless terminal which has subscribed to the multimedia messaging service, arrives at the multimedia message service centre MMSC, the multimedia message service centre MMSC stores the multimedia message in its memory and transmits a notification message 30 to the wireless terminal to indicate that the multimedia message has been stored. The multimedia components may be, for example, text, images, photographs, audio clips or video clips in electronic format. One multimedia message can also contain other types of multimedia component.

Figure 5A:
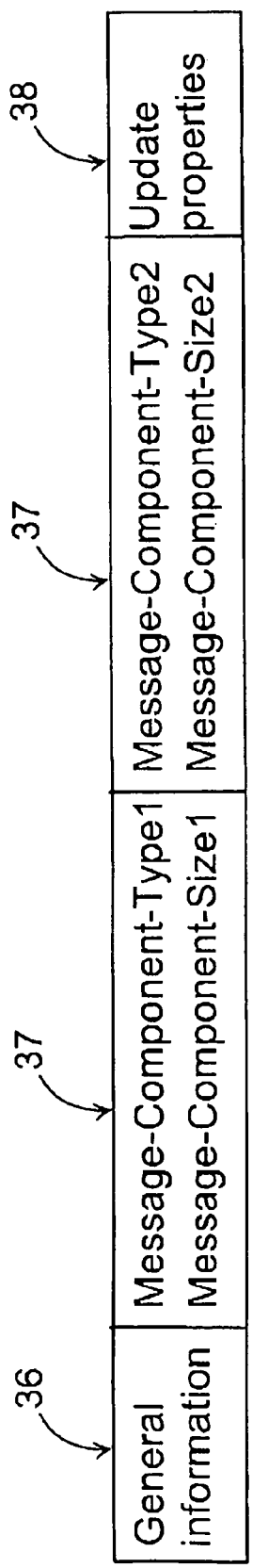
FIG. 5a shows a rudimentary structure of a notification message.

In an advantageous embodiment of the invention, a content type, which in this context is called a Multimedia Message Indication (MMI), is used to implement the notification message 30. The MMI is a content type that is defined in such a way that it allows the transmission of information in both text and binary format within the same content type. Advantageously, both an Internet compatible XML (Extensible Markup Language) text representation and a binary format according to WAP binary coding are defined for the MMI content type. One possible basic structure of a MMI-type notification message 30 is shown in the appended FIG. 5a, in which the notification message 30 comprises a "general information" section 36, fields 37 (of which there are two in the example of FIG. 5a) for indicating the properties of the multimedia components contained in multimedia messages, as well as a field 38 for a request to update the properties of the wireless terminal MS.

Figure 4:
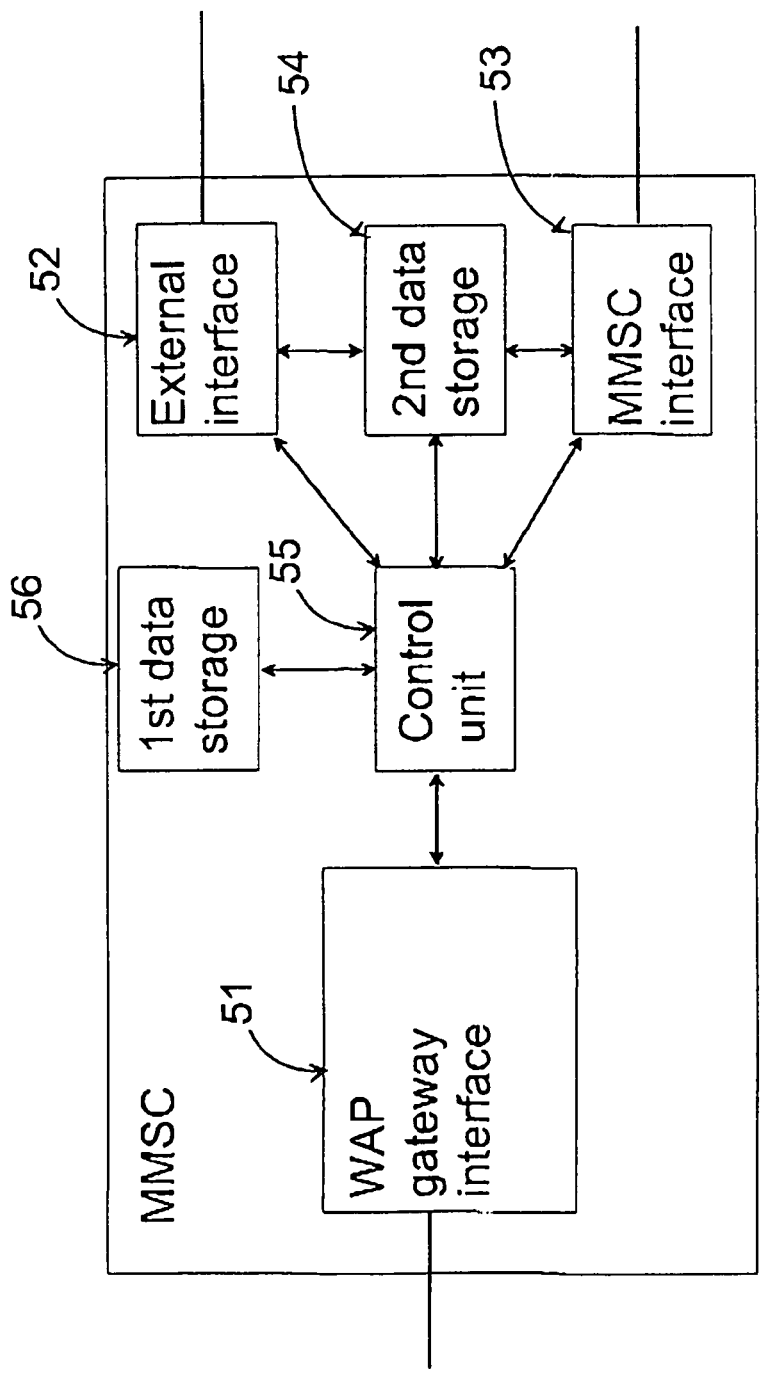
FIG. 4 is a block diagram showing the functional blocks of a multimedia message service centre.

To implement the method according to the invention, the multimedia message service centre MMSC, of which the appended FIG. 4 shows a preferred embodiment in a reduced block diagram, is provided with a first data storage 56 (cache)

into which it is possible to store information on the properties of a wireless terminal MS. This first data storage 56, which is advantageously formed in a memory area specified in the memory of the multimedia message service centre MMSC, can be either fixed in length or its length can vary in accordance with the demand at a given time. The information on the properties of the wireless terminals MS, stored in the fist data storage 56 includes, for example, the hardware properties of the wireless terminal MS, software properties, the properties of the multimedia service application, as well as possible user settings.

Figure 2:
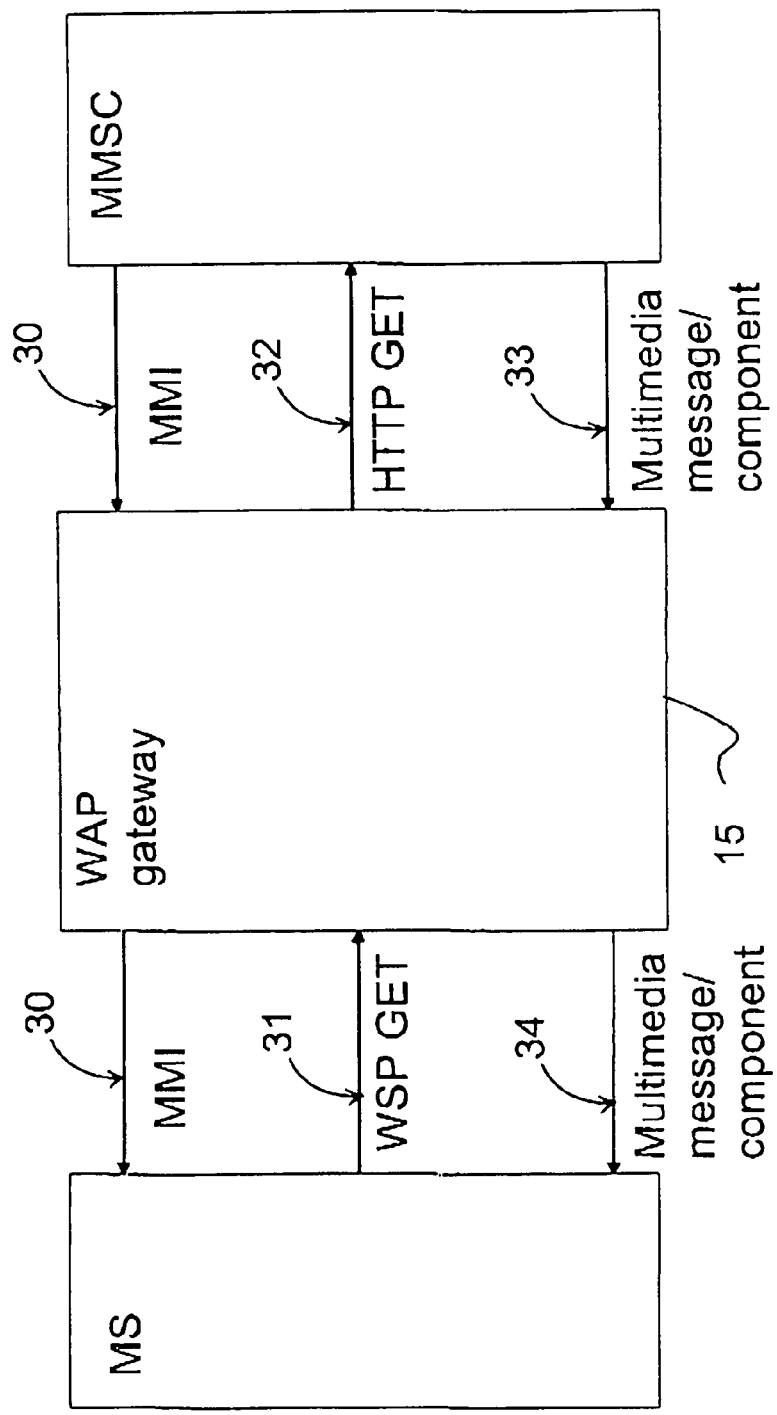
FIG. 2 illustrates the implementation of the method according to the invention in a WAP system.

In the following, the operation of the method according to a preferred embodiment of the invention will be described in greater detail with reference to the system shown in FIG. 2. In a situation where the multimedia message service centre MMSC receives a multimedia message, the service centre examines the address data of the message to determine to which wireless terminal MS the message in question is addressed. The address information can be e.g. a phone number, an IP address or URL (Uniform Resource Locator). When the terminal intended to receive the message has been determined, the multimedia message service centre MMSC transmits a notification message 30 via the WAP gateway 15 to the wireless terminal MS, reporting that a multimedia message addressed to the wireless terminal MS has arrived at the multimedia message service centre MMSC.

The notification message 30 is advantageously transmitted using a so-called connectionless service supported by WAP. In a connectionless service, such as the short message service (SMS) known from the GSM system, transmission of a message to the receiver does not require a connection to be established. In the transmission of multimedia messages to a wireless terminal MS in accordance with the present invention, a connection oriented service is, however, advantageously used.

The notification message 30 transmitted to the wireless terminal MS by the multimedia message service centre MMSC, contains specific information on the properties of the multimedia message for the purposes of making decisions in the wireless terminal in connection with the retrieval of the multimedia message. Advantageously, said notification message 30 contains information 37 on the size and type of the multimedia message stored in the multimedia message service centre MMSC, or the size and type of the components it comprises. Said type is indicated in the notification message 30 either using MIME types in text format (e.g. image/jpeg, text/plain, video/mpeg, audio/wav) or in corresponding binary equivalents defined in WAP. Furthermore, the notification message 30 can contain information on the importance of the multimedia message, i.e. a so-called priority value. Typically, the notification message 30 contains information on the sender of the multimedia message as well as the URL or URI (Uniform Resource Indicator) of the multimedia message, or some other identifier for identification of the multimedia message. If the multimedia message comprises more than one multimedia component, the notification message 30 can also comprise an identifier as well as the other said information (type, size, address information, video format, audio format, etc.) separately for each multimedia component of the multimedia message. When necessary, the multimedia message 30 also comprises a request to update the property information 38 of the wireless terminal stored in the MMSC.

The property information of the wireless terminal MS, stored in the multimedia message service centre MMSC, is advantageously valid for a certain period of time. Thus, when a multimedia message arrives at the multimedia message service centre MMSC to be forwarded to a wireless terminal MS, the MMSC advantageously examines, preferably before the notification message 30 is transmitted, whether information on the properties of the wireless terminal MS in question has been stored in the memory of the multimedia message service centre MMSC. If property information is stored, the MMSC also examines whether the property information is still valid. This can be performed, for example, in such a way that the MMSC supplements the property information with information on the time at which the information was stored (time label). In addition, a maximum time of validity is defined for the property information. The multimedia message service centre MMSC compares the time label in the property information of the wireless terminal MS in question with the maximum time of validity. If the comparison shows that the time of validity has not expired, it is not necessary to request property information to be transmitted. If, however, the comparison shows that the property information is too old (although the properties may not have necessarily changed at all), the multimedia message service centre MMSC requests the wireless terminal MS to update the information on its properties.

In a preferred embodiment of the invention, the multimedia message service centre MMSC deletes outdated information from the first data storage 56, and thus it is not possible to find the property information of the wireless terminal MS in question stored therein. The deletion of property information can also result from the fact that the storage capacity allocated for property information has become full, wherein preferably the oldest information is deleted. In this embodiment, the wireless terminal MS transmits property information when the multimedia message service centre MMSC has requested it, even if the properties have not changed at all.

In another preferred embodiment of the invention, the multimedia message service centre MMSC does not necessarily delete property information whose time label indicates that it has expired. Thus, new information is written over the expired information when the multimedia message service centre MMSC has received the information from the wireless terminal MS. If the wireless terminal MS does not transmit property information, even though the multimedia message service centre MMSC has requested it, the MMSC assumes that the information related to the wireless terminal in question is still valid. Thus, the multimedia message service centre MMSC sets a new time label for the property information preferably at the stage when the wireless terminal MS transmits a connection set-up message 40, which will be described in more detail later in this description. In this embodiment, it is therefore possible to reduce message transmission even further, especially in situations in which the properties have not actually changed, even if the time label indicates that the information has expired.

Which of the above-described embodiments is implemented in the multimedia message service centre MMSC can be indicated to the wireless terminal MS, for example, in such a way that two different requests to update the wireless terminal property information are used in the notification message 30.

If the multimedia message service centre MMSC contains stored information on the properties of the wireless terminal MS in question and if the property information is still valid, this can be utilized when notifying the wireless terminal of a multimedia message and when transmitting the multimedia message to the wireless terminal MS. In this situation, it is not necessary to update the property information, and thus the multimedia message service centre MMSC sets a value corresponding to a no-update request, for example the binary value 0, in field 38 of the notification message. If, however, information on the properties of the wireless terminal MS in question is not currently stored in the memory of the multimedia message service centre MMSC, or the information is not valid, the MMSC requests the wireless terminal MS to transmit information to the multimedia message service centre MMSC by setting a value corresponding to an update request, for example the binary value 1 in field 38. If it is desired that the wireless terminal MS should transmit property information only if it has changed, the value 2, for example, is placed in field 38. It is obvious that other methods for the transmission of a property update request to the wireless terminal MS can also be adopted.

Figure 5B:
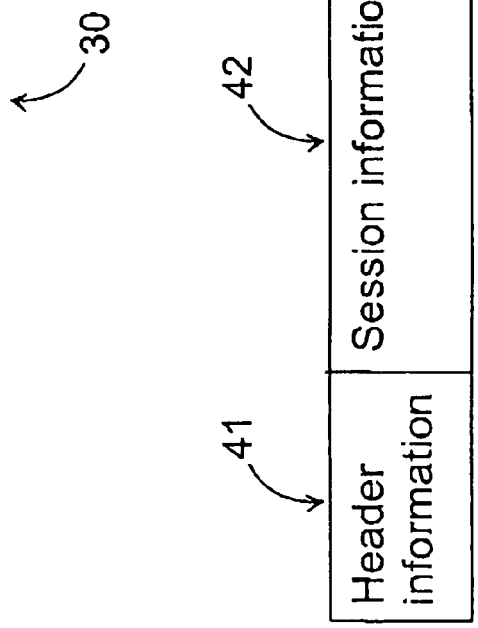
FIG. 5b shows a rudimentary structure of a connection set-up message.

On receiving said notification message 30, the wireless terminal MS first initiates formation of a connection with the multimedia message service centre MMSC (WAP WSP CONNECT), if there is no connection between the wireless terminal MS and the MMSC at that time. Typically, connection set-up is conducted in such a way that the wireless terminal MS opens a WSP session with the WAP gateway 15 in a manner known as such from WAP, and the WAP gateway 15, in turn, opens for example an IP connection with the multimedia message service centre MMSC. Information on the bearer selected by the wireless terminal MS to be used in the WSP session to be opened is transmitted from the wireless terminal MS to the WAP gateway 15 in a WSP HEADER field as a Bearer indication value, in a manner known as such from WAP. The transmission of said information takes place during the negotiation phase between the wireless terminal MS and the WAP gateway 15 when the WSP session is opened, for example in a connection set-up message 40 (FIG. 5*b*). If an update request is set in the field 38 in the notification message 30, the wireless terminal MS adds information on the properties of the wireless terminal MS to the connection set-up message 40. A Uaprof information message in accordance with WAP specifications can be used, for example, as connection set-up message 40. This information is attached for example in a header field 41 of the connection set-up message, such as a profile header field or a profile-diff header field, as defined in the Uaprof specification of WAP. Thus, the multimedia message service centre MMSC can determine on the basis of the message header field that the message contains information on the properties of the terminal. In some applications, it may be necessary to add explicit information to the connection set-up message indicating that the message contains property information of the terminal.

Information 42 necessary for establishing a session is transmitted in the connection set-up message 40. The multimedia message service centre MMSC receives the connection set-up message 40 and if it detects that information on the properties of the wireless terminal MS has been transmitted in the message, the MMSC transfers the information on the properties of the wireless terminal MS contained in the message to the first data storage 56. After the connection set-up, the multimedia message service centre MMSC has up-to-date information on the properties of the wireless terminal MS in question in first data storage 56. In addition to this property information, information for identifying the wireless terminal MS is stored in the first data storage 56, whereupon the multimedia message service centre MMSC is capable of determining which property information is related to each wireless terminal. It is possible to use, for example, the international mobile equipment identity IMEI or some other unique identifier as information identifying a wireless terminal MS.

The multimedia message service centre MMSC responds to the connection set-up message with an acknowledgement message, in which the wireless terminal MS is notified whether it is possible to set up a connection. Connection set-up can fail, for example, in a situation where the user of the terminal addressed as a receiver does not have a subscriber contract with the multimedia messaging service, the subscriber connection has been closed due to unpaid bills, etc.

When the connection has been established, it is possible to start the transmission of the multimedia message from the multimedia message service centre MMSC to the wireless terminal MS. In order to optimize radio resources, the wireless terminal MS can select the most appropriate bearer for the transmission of each multimedia component.

In a system according to a preferred embodiment of the invention, the wireless terminal MS makes a decision on the selection of the bearer on the basis of certain information transmitted in said notification message 30. This information typically includes information on the size and type of the multimedia message or the multimedia components it comprises. The selection of a bearer can be made on the basis of just one of the properties of a multimedia message or multimedia components contained therein. Thus, the selection of a bearer can be made for each multimedia component contained in a multimedia message, for example, just on the basis of the size of the multimedia components. Furthermore, when decisions are made, it is possible to take into account certain user configurable rules, the priority of the multimedia message and certain properties of the wireless terminal MS, such as its free memory capacity as well as its capability to process different types of multimedia component and present them on its display. This processing capability is dependent among other things on the hardware properties of the wireless terminal MS, as well as on the programs installed in the wireless terminal MS. The multimedia message can be retrieved from the multimedia message service centre MMSC for example by means of the GET method specified in WAP. In this method the wireless terminal transmits a GET request in binary format to the WAP gateway 15 to initiate the transmission of multimedia message components. The gateway 15 transforms the GET request 31 into a GET request according to the Internet protocol, for example into a GET request 32, and transmits it to the multimedia message service centre MMSC.

In this system according to a preferred embodiment of the invention, it is not necessary at the application level for the wireless terminal MS to separately request the multimedia message service centre MMSC to transmit those multimedia message components which the wireless terminal MS is able to process. Thus, these components do not have to be identified in the GET request 31, but the multimedia message service centre MMSC selects for transmission those multimedia message components defined in the property information of the receiving wireless terminal MS, stored in the first data storage 56. Thus, in a situation where a multimedia message contains only components which the wireless terminal MS can process, it is not necessary for the GET request 31 to contain information about these components. Correspondingly, in a situation where the multimedia message contains components which the wireless terminal MS is not able to process, the following steps are taken in a system according to a preferred embodiment of the invention. If the wireless terminal MS or its user also decides to receive components which the wireless terminal MS cannot process directly, the multimedia application of the wireless terminal MS requests those components to be transmitted from the multimedia message service centre MMSC. Thus, these components are identified in said GET request 31. Such an operation can be necessary for example in a situation where the user connects the wireless terminal MS to a computer, such as a portable computer (not shown), which is capable of processing multimedia message components which cannot be processed but merely transmitted e.g. to said portable computer by the wireless terminal MS.

If, on the other hand, the user of the wireless terminal MS does not want to receive all components which can be processed by the wireless terminal MS, the user, for example, can change the property information of the wireless terminal MS in a corresponding manner, wherein the property information is transmitted to the multimedia message service centre MMSC, as presented earlier in this description.

The multimedia message service centre MMSC examines the contents of the transformed GET request 32 it receives and initiates the transmission of multimedia message components. The multimedia message service centre MMSC compares the components contained in the multimedia message to be transmitted to the wireless terminal MS with the property information of the wireless terminal MS stored in the first data storage 56 in the multimedia message service centre MMSC. On the basis of the comparison, the multimedia message service centre MMSC selects those components to be transmitted which are supported by the wireless terminal MS in question. In addition, the multimedia message service centre MMSC examines whether the wireless terminal has requested the MMSC to transmit also other possible components of the multimedia message. If this is the case, the MMSC also selects these components to be transmitted to the wireless terminal MS. Thereafter it is possible to start the transmission 33 of the selected components of the multimedia message via the IP connection to the WAP gateway 15, which transmits 34 the component/components to the wireless terminal MS via a bearer selected by the wireless terminal MS for the WSP session in question using either a connection oriented or connectionless service.

If the multimedia message to be transmitted comprises multimedia components of more than one type, the wireless terminal MS will have typically selected different bearers for the transmission of multimedia components of different types in the manner previously presented. Thus, the multimedia component for whose transmission the wireless terminal MS has selected the bearer which is in use in the WSP session in progress, is transmitted first, A change of bearer can be conducted by placing the WSP session in a Suspend state by means of an S-Suspend primitive and by starting it again by means of an S-Resume primitive. Thus, the bearer used in the WSP session in question can also be changed. In an advantageous embodiment of the present invention each component of the multimedia message selected for transmission is matched, for example, in the MMSC with the bearer(s) selected by the wireless terminal. Thus, a suitable correspondence is achieved between a multimedia component(s) to be transmitted and the bearer(s) used for its transmission.

Using the method according to the invention, it is thus unnecessary to transmit information about the properties of the wireless terminal MS in connection with the transmission of each multimedia message, and thus it is possible to reduce message transmission over the radio path, when compared to methods of prior art.

As was mentioned earlier in this description, it is possible to define either a fixed memory area for the first data storage 56 in the multimedia message service centre MMSC, or the memory area can be expanded when necessary. If a fixed memory area is used, a situation may occur in which the property information of all required wireless communication stations does not fit into the first data storage 56. Let us assume that a multimedia message service centre MMSC receives a multimedia message which is addressed to such a wireless terminal whose property information is not stored in the first data storage 56. In this situation, it is possible to operate, for example, in such a way that the multimedia message service centre MMSC searches the first data storage 56 for property information which has expired. After the MMSC has received the property information from the wireless terminal, the information is recorded over the expired information. If none of the property information has yet expired, new property information is recorded advantageously over property information whose time label is substantially the oldest.

It is obvious, that in practical applications, the storage capacity allocated for the first data storage 56 cannot be expanded limitlessly. Thus, the procedures mentioned above in connection with a fixed memory area may also be necessary in connection with an expandable memory area. This situation may be encountered if the popularity of WAP communication increases significantly, wherein there may be multimedia messages to be transmitted to a large group of wireless terminals MS.

Even though it has been stated previously that the Wireless terminal MS transmits property information only when the multimedia message service centre MMSC requests it to be transmitted, it is obvious that the wireless terminal MS can also transmit property information even if the multimedia message service centre MMSC does not request it. This may be necessary e.g. in such a situation where the wireless terminal MS detects that its properties have changed since the previous transmission of the property information to the multimedia message service centre MMSC. Properties can change, for example, in connection with a software version update or hardware changes. In such a situation property information is also preferably updated in connection with a connection set-up message 40.

The invention can also be implemented without WAP technology, in which case the implementation is dependent on the network in question. For example, communication between an Internet server implementing the functionality of a multimedia message service centre MMSC and a wireless terminal MS is possible directly by means of packet switching using IP protocols. The radio path can be traversed using IP protocols, for example, over the packet network GPRS of the GSM network. In this case, the element connecting the wireless network and the Internet is a gateway GPRS support node GGSN instead of a WAP gateway. In this case, the selection of a bearer according to the invention can be made between the bearers supported by the GPRS, which include, for example, GPRS-SMS, GPRS data call and other bearers specified in GPRS. A corresponding solution is also possible in third generation networks.

Even though a connection oriented service was used in the above-described examples in the transmission of multimedia components to the wireless terminal MS, it is obvious that the present invention can also be applied when multimedia components are transmitted in a connectionless manner. Also in such an implementation, the multimedia message service centre MMSC can examine property information of the wireless terminal in the first data storage 56 and select for transmission those components which the wireless terminal MS can process. If the multimedia message contains components which the wireless terminal MS cannot process, the multimedia message service centre MMSC can advantageously transmit information about these components to the wireless terminal, wherein the wireless terminal MS can separately request these components to be transmitted.

The invention can be implemented by means of a program by making the necessary changes in the program code in the wireless terminal MS and in the multimedia message service centre MMSC. The computer program products in question can be recorded on a data carrier, for example in a memory, they can be transferred and executed e.g. in a computer or in the microprocessor of a mobile phone. Program changes which are necessary in connection with the implementation of changes in the MMI data structure, are conducted in the WAP gateway interface of the multimedia message service centre MMSC.

Figure 3:
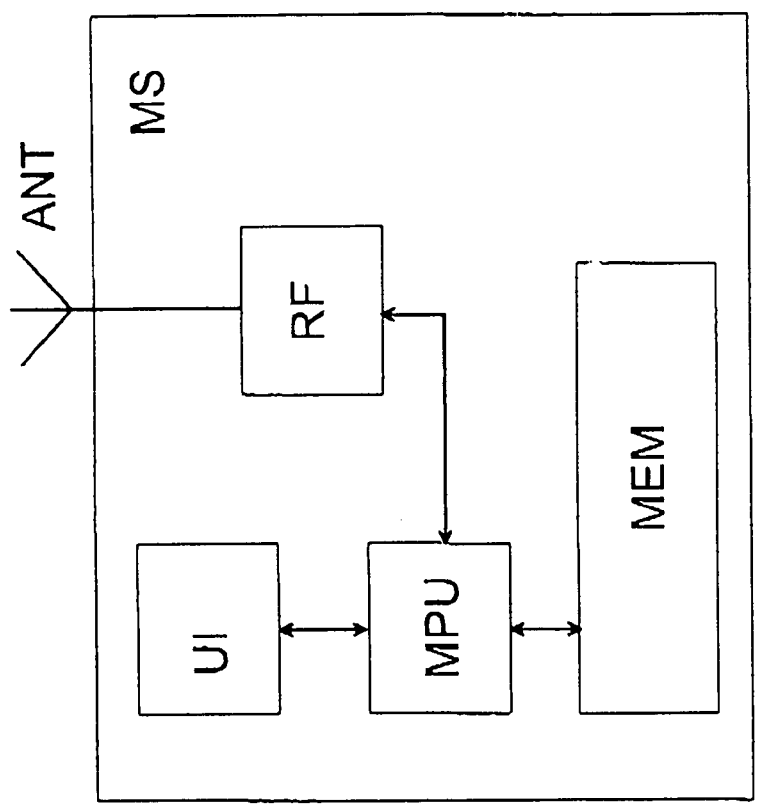
FIG. 3 illustrates the basic parts of a wireless terminal implementing a method according to the invention.

FIG. 3 illustrates the basic functional parts of a wireless terminal MS applying the method according to a preferred embodiment of the invention. The wireless terminal MS comprises a processor MPU and parts connected functionally to the processor: a memory MEM, a user interface UI and a radio part RF. The processor MPU is advantageously a microprocessor, a micro-controller or a digital signal processing unit (DSP, Digital Signal Processor). Advantageously, the memory MEM comprises a non-volatile memory (ROM, read only memory) and a random access memory (RAM). The radio part RF can transmit radio frequency signals, such as messages according to the WAP protocol, and receives radio frequency signals, such as multimedia messages, via an antenna ANT. Advantageously, the user interface UI provides the user with a display and a keyboard so that it is possible to operate the wireless terminal.

The software of the wireless terminal MS, also the software associated with implementation of the multimedia messaging service, is typically stored in the read only memory. On the basis of the software, the processor MPU controls the function of the wireless terminal MS, for example the use of the radio part RF, the presentation of the messages at the user interface UI and the reading of input received from the user interface UI. The software, which can be implemented in various ways, advantageously comprises program blocks which are responsible for implementing different procedures. These procedures include, for example, procedures associated with the presentation of multimedia components contained in the multimedia messages to the user, as well as the procedures related to the transmission and reception of messages, such as examining update request information and preparation of property information for transmission. In the wireless terminal MS, the multimedia messaging service is implemented by the processor MPU together with the software of the wireless terminal and the memory MEM. The processor MPU uses the random access memory as a temporary buffer memory when processing information.

The block diagram of FIG. 4 illustrates the functional blocks of the multimedia message service centre MMSC in relation to implementation of the present invention. The multimedia message service centre MMSC comprises a WAP gateway interface 51 via which the multimedia message service centre MMSC communicates with the WAP gateway 15. Communication with other networks outside the WAP system is conducted via an external interface 52 and communication with other multimedia message service centres is conducted via MMSC interface 53. The first data storage 56 is a database in which information on the properties of wireless terminals is recorded and stored. The second data storage 54 is a database in which multimedia messages are recorded and stored. A control unit 55 controls the function of the multimedia message service centre MMSC. Furthermore, the multimedia message service centre MMSC typically comprises some blocks related to authentication and to the maintenance of the multimedia message service centre MMSC, which are not, however, shown in the appended FIG. 4 for the sake of clarity.

Multimedia messages addressed to a wireless terminal MS arrive at the multimedia message service centre MMSC via one of its interfaces (51-53) and they are stored in the second data storage 54. The notification message 30 transmitted to the wireless terminal MS is advantageously generated in the WAP gateway interface 51 at the command of the control unit 55. Transmission of the notification message 30 takes place via the WAP gateway interface 51. Also, those multimedia messages or the multimedia components contained in said multimedia messages, which are retrieved from the multimedia message service centre MMSC by the wireless terminal MS, are transmitted 33 in due course to the wireless terminal MS via the same route.

It is obvious that the present invention is not restricted solely to the embodiments presented above, but can be modified within the scope of the appended claims.

What is claimed is:

1. A method comprising:
   receiving and storing a multimedia message;
   retrieving information about properties of a wireless terminal from a user profile for the wireless terminal stored in the server;
   identifying by said server at least one component of the multimedia message which the wireless terminal can handle according to the retrieved properties of the wireless terminal; and
   transmitting the at least one component to the wireless terminal.

2. The method according to claim 1, further comprising:
   selecting at least one bearer for transmission of the at least one component of the multimedia message based on the type of content of the at least one component.

3. The method according to claim 2, wherein the selection of at least one bearer is performed in the wireless terminal.

4. The method according to claim 1, further comprising:
   transmitting a notification message to the wireless terminal comprising information about at least one property of said at least one multimedia component.

5. The method according to claim 1, wherein said information on the properties of the wireless terminal comprises information on the available storage capacity of the wireless terminal.

6. The method according to claim 1, wherein said information on the properties of the wireless terminal comprises information on the capability of the wireless terminal to process multimedia components of a particular type.

7. The method according to claim 6, wherein the capability of the wireless terminal to process multimedia components is defined on the basis of the hardware properties of the wireless terminal and/or the properties of the programs installed in the wireless terminal.

8. The method according to claim 1, wherein a maximum time of validity is defined for the information on the properties of the wireless terminal stored in said server.

9. The method according to claim 1, further comprising:
   transmitting a notification message to the wireless terminal to indicate that a multimedia message has arrived at the server; wherein the notification further comprises a request to update the properties of the wireless terminal; and
   receiving and storing information to update the properties of the wireless terminal stored at the server.

10. The method according to claim 1, wherein a WAP terminal is used as a wireless terminal and that a multimedia message service centre is used as a server.

11. The method according to claim 1, wherein the at least one component of the multimedia message is transmitted without receiving a transmission request from the wireless terminal.

12. A method according to claim 1, further comprising:
receiving a Uaprof information transmission message about the properties of the wireless terminal.

13. A method according to claim 12, wherein the Uaprof information transmission message is formed in accordance with WAP specifications.

14. A server for multimedia messaging service comprising:
a receiving element for receiving a multimedia message;
a data storage for storing a user profile comprising information on properties of a wireless terminal;
a control unit for retrieving information about properties of the wireless terminal stored in the data storage and for determining at least one component of the multimedia message which the wireless terminal can handle according to the retrieved information; and
a transmitting element for transmitting to the wireless terminal the at least one component of the multimedia message.

15. The server according to claim 14, wherein the server is configured to transmit a notification message to the wireless terminal comprising information about at least one property of said at least one multimedia component.

16. The server according to claim 14, wherein a maximum time of validity is specified for said information on at least one property of the wireless terminal stored in said server.

17. The server according to claim 14, the server is further configured to transmit a notification message to the wireless terminal to indicate that a multimedia message has arrived, the notification message comprising a request to update the properties of the wireless terminal, and to receive and store information to update the properties of the wireless terminal at the data storage.

18. The server according to claim 17, wherein the server is configured to examine the validity of said property information of the wireless terminal stored in said data storage, and request to update the properties of the wireless terminal in said notification message.

19. The server according to claim 14, characterized in that it is a multimedia message service centre.

20. A server according to claim 14, wherein the server is configured to transmit at least one component of the multimedia message to the wireless terminal without receiving from the wireless terminal an identification of the at least one component which the wireless terminal is able to process.

21. A server according to claim 14, wherein the server is configured to transmit the at least one component of the multimedia message without receiving a transmission request from the wireless terminal.

22. A server according to claim 14, wherein said information about the properties of the wireless terminal includes information about the available memory of the wireless terminal.

23. A server according to claim 14, wherein said information about the properties of the wireless terminal includes information about the capability of the wireless terminal to process a certain type of component.

24. A server according to claim 23, wherein the capability of the wireless terminal to process a certain type of component is defined by at least one of the following: hardware properties of the wireless terminal, software properties of the wireless terminal, software properties of an accessory device attached to the wireless terminal.

25. A wireless terminal comprising:
a receiving element for receiving a notification message to indicate receipt of a multimedia message at a server; and
a transmitter for transmitting a request to the server for transmission of at least one component of the multimedia message without identifying the component which the wireless terminal is able to process.

26. The wireless terminal according to claim 25, wherein the wireless terminal is configured to select at least one bearer for transmission of at least one component of the multimedia message based on the type of content of the at least one component.

27. The wireless terminal according to claim 25, wherein said information on the properties of the wireless terminal comprises information on the available storage capacity available of the wireless terminal.

28. The wireless terminal according to claim 25, wherein said information on the properties of the wireless terminal comprises information on the capability of the wireless terminal to process multimedia components of a particular type.

29. The wireless terminal according to claim 28, wherein the capability of the wireless terminal to process multimedia components is specified on the basis of the hardware properties of the wireless terminal and/or on the basis of the properties of the programs installed in the wireless terminal.

30. The wireless terminal according to claim 25, wherein the wireless terminal is configured to transmit information on the properties of the wireless terminal to the server in response to a property information update request in the notification message.

31. The wireless terminal according to claim 25, wherein the wireless terminal is a WAP terminal.

32. A wireless terminal according to claim 25, wherein said request includes information to retrieve a Uaprof information.

33. A wireless terminal according to claim 25, wherein the wireless terminal is configured to form the Uaprof information transmission message in accordance with WAP specifications.

* * * * *